United States Patent
Heubel (10) Patent No.: US 10,427,039 B2
(45) Date of Patent: Oct. 1, 2019

(54) HAPTIC SURROUND FUNCTIONALITY

(71) Applicant: Immersion Corporation, San Jose, CA (US)

(72) Inventor: Robert W. Heubel, San Leandro, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/372,678

(22) Filed: Dec. 8, 2016

(65) Prior Publication Data

US 2018/0161671 A1 Jun. 14, 2018

(51) Int. Cl.
| | |
|---|---|
| A63F 9/00 | (2006.01) |
| A63F 13/285 | (2014.01) |
| G06F 3/01 | (2006.01) |
| A63F 13/25 | (2014.01) |
| A63F 13/211 | (2014.01) |
| A63F 13/213 | (2014.01) |
| A63F 13/5255 | (2014.01) |
| A63F 13/212 | (2014.01) |
| G06T 19/00 | (2011.01) |

(52) U.S. Cl.
CPC .......... *A63F 13/285* (2014.09); *A63F 13/211* (2014.09); *A63F 13/212* (2014.09); *A63F 13/213* (2014.09); *A63F 13/25* (2014.09); *A63F 13/5255* (2014.09); *G06F 3/011* (2013.01); *G06F 3/016* (2013.01); *A63F 2300/1037* (2013.01); *G06F 2203/013* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 6,088,017 A | * | 7/2000 | Tremblay | G06F 3/011 345/156 |
| 6,275,213 B1 | * | 8/2001 | Tremblay | G06F 3/011 345/156 |
| 7,390,157 B2 | * | 6/2008 | Kramer | G06F 3/011 414/5 |
| 7,472,047 B2 | * | 12/2008 | Kramer | G06T 19/20 703/6 |

(Continued)

OTHER PUBLICATIONS

Extended European Search Report issued in European Application 17192826.0 dated Mar. 22, 2018, 8 pages.

*Primary Examiner* — Seng Heng Lim
(74) *Attorney, Agent, or Firm* — Medler Ferro Woodhouse & Mills PLLC (57) ABSTRACT

A system provides haptic surround functionality. The system determines a location of a virtual event in a virtual environment. The system also determines a location of a first virtual body area of a virtual user in the virtual environment based on a location of a first body area of a user, where the first body area corresponds to the first virtual body area. The system then determines a first haptic effect based on the virtual event, the location of the virtual event in the virtual environment, and the location of the first virtual body area of the virtual user in the virtual environment. The system outputs the first haptic effect by a first haptic output device to the first body area of the user.

20 Claims, 7 Drawing Sheets

(56) References Cited

U.S. PATENT DOCUMENTS

| | | | |
|---|---|---|---|
| 8,553,049 B2* | 10/2013 | Nogami | A63F 13/10 |
| | | | 345/173 |
| 9,229,530 B1* | 1/2016 | Wu | G06F 3/016 |
| 9,466,187 B2 | 10/2016 | Grant et al. | |
| 9,710,772 B1* | 7/2017 | Kelly | G06Q 10/06316 |
| 9,799,315 B2* | 10/2017 | Hardi | G10H 3/146 |
| 2003/0067440 A1* | 4/2003 | Rank | G06F 3/016 |
| | | | 345/156 |
| 2008/0094351 A1* | 4/2008 | Nogami | G06F 3/016 |
| | | | 345/156 |
| 2008/0153590 A1 | 6/2008 | Ombrellaro et al. | |
| 2013/0198625 A1 | 8/2013 | Anderson et al. | |
| 2013/0207886 A1 | 8/2013 | Hall | |
| 2014/0192087 A1 | 7/2014 | Frost | |
| 2017/0168571 A1* | 6/2017 | Levesque | G06F 3/016 |

\* cited by examiner

Fig. 7

HAPTIC SURROUND FUNCTIONALITY

FIELD

One embodiment is directed generally to a haptic system, and in particular, to a haptic surround system.

BACKGROUND INFORMATION

"Haptics" relates to a tactile and force feedback technology that takes advantage of the sense of touch of a user by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

SUMMARY

One embodiment is a system that provides haptic surround functionality. The system determines a location of a virtual event in a virtual environment. The system also determines a location of a first virtual body area of a virtual user in the virtual environment based on a location of a first body area of a user, where the first body area corresponds to the first virtual body area. The system then determines a first haptic effect based on the virtual event, the location of the virtual event in the virtual environment, and the location of the first virtual body area of the virtual user in the virtual environment. The system outputs the first haptic effect by a first haptic output device to the first body area of the user.

DETAILED DESCRIPTION

One embodiment provides surround haptic playback in a virtual reality ("VR"), augmented reality ("AR"), or mixed reality ("MR") environment. In one embodiment, multiple actuators are implemented in conjunction with a VR/AR/MR system to customize a haptic experience based on user preferences and without relying solely on the haptic capabilities of the input controllers (e.g., the electronic peripherals used to control user interactions within the VR/AR/MR software environment) which are provided as part of the VR/AR/MR system. In one embodiment, a user of a VR/AR/MR system may freely add haptic feedback to their user experience when and where they wish and without typical VR/AR/MR controller constraints that limit haptic feedback to pre-configured controllers. While the embodiment accounts for such pre-configured controllers, it further expands the "feel point" possibilities for users to experience a more surrounded and positionally-based tactile VR/AR/MR environment.

Figure 1:
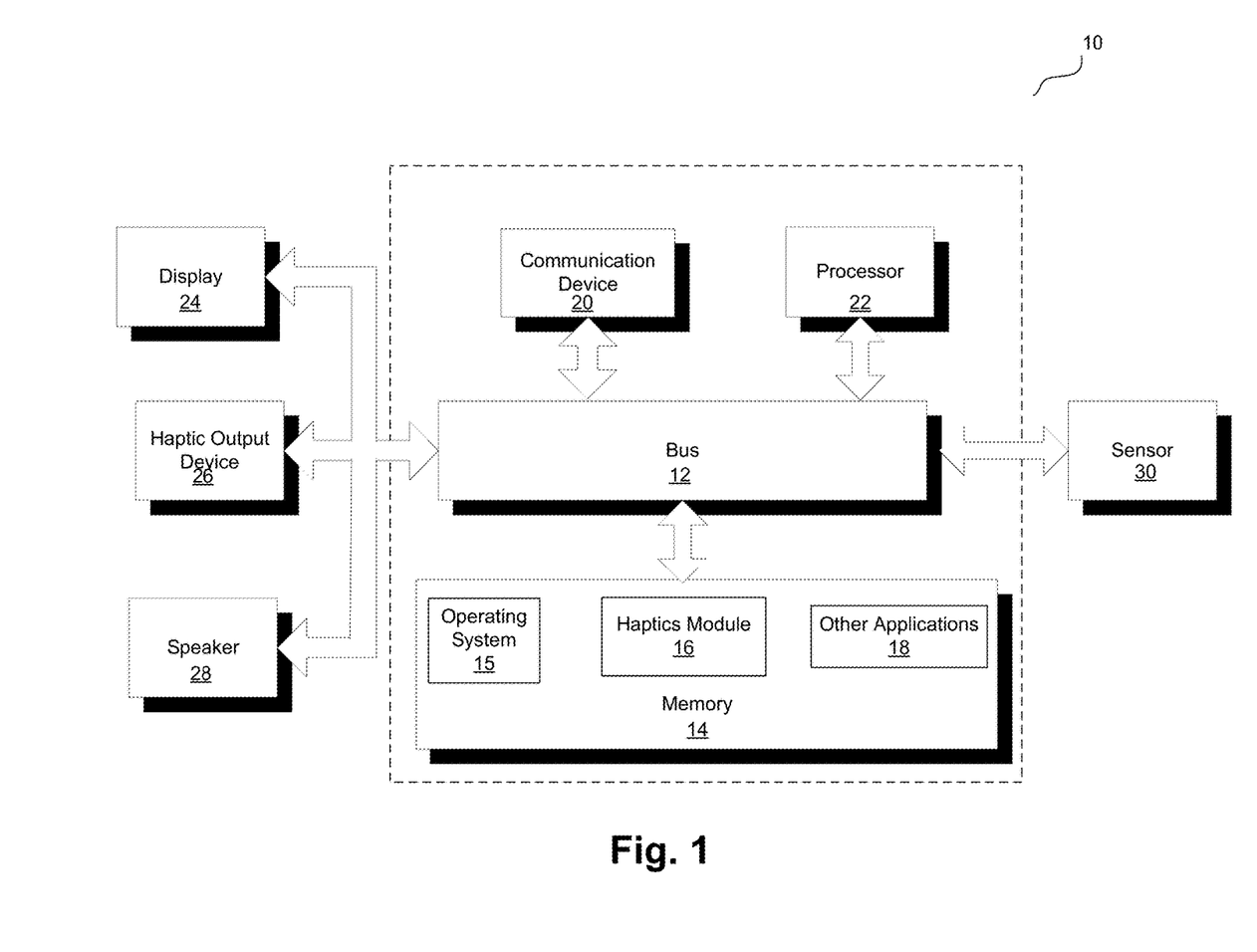
FIG. 1 is a block diagram of a computer server/system in accordance with an embodiment of the present invention.

FIG. 1 illustrates a block diagram of a system 10 in accordance with one embodiment of the invention. In some embodiments, system 10 may function as a haptic actuation module ("HAM") or an actuation point as disclosed below. In these embodiments, system 10 may not include one or more of the modules depicted in FIG. 1, such as a sensor 30, a speaker 28, or a display 24. In some embodiments, system 10 may function as a VR/AR/MR system as disclosed below.

In one embodiment, system 10 is part of a mobile device (e.g., a smartphone) or a non-mobile device (e.g., a game controller), and system 10 provides haptic functionality for the device. In another embodiment, system 10 is part of a device that is incorporated into an object in contact with a user in any way (e.g., furniture), and system 10 provides haptic functionality for such a device. For example, in one embodiment, system 10 is part of a wearable device, and system 10 provides haptic functionality for the wearable device. Examples of wearable devices include wrist bands, headbands, eyeglasses, rings, leg bands, footwear, arrays integrated into clothing, or any other type of device that a user may wear on a body or can be held by a user. Some wearable devices can be "haptically enabled," meaning they include mechanisms to generate haptic effects. In another embodiment, system 10 is separate from the device (e.g., a mobile device or a wearable device), and remotely provides haptic functionality for the device.

Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of transitory or non-transitory computer-readable medium.

A computer-readable medium may be any available medium that can be accessed by processor 22 and may include both a volatile and nonvolatile medium, a removable and non-removable medium, a communication medium, and a storage medium. A communication medium may include computer-readable instructions, data structures, program modules, or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disks, removable disks, compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptics module 16 that provides haptic functionality, as disclosed in more detail herein. In certain embodiments, haptics module 16 may comprise a plurality of modules, where each module provides specific individual functionality for providing haptic effects. System 10 typically includes one or more additional application modules 18 to include additional functionality, such as TouchSense® software by Immersion Corp.

System 10, in embodiments that transmit and/or receive data from remote sources, further includes a communication device 20, such as a network interface card, to provide mobile wireless network communication, such as infrared, radio, Wi-Fi, cellular network communication, etc. In other embodiments, communication device 20 provides a wired network connection, such as an Ethernet connection, a modem, etc.

Processor 22 is further coupled via bus 12 to a display 24, such as a Liquid Crystal Display ("LCD"), for displaying a graphical representation or user interface ("UI") to a user. The display 24 may be a touch-sensitive input device, such as a touch screen, configured to send and receive signals from processor 22, and may be a multi-touch touch screen.

System 10, in one embodiment, further includes a haptic output device 26. Processor 22 may transmit a haptic signal associated with a haptic effect to haptic output device 26, which in turn outputs haptic effects such as vibrotactile haptic effects, electrostatic friction haptic effects, deformation haptic effects, etc. Haptic output device 26 may be an actuator and may include an actuator drive circuit. Haptic output device 26 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, etc. In alternate embodiments, system 10 may include one or more additional haptic output devices, in addition to haptic output device 26. Alternatively or additionally, haptic output device 26 may operate according to any other haptic technology such as thermal displays (e.g., hot/cold), electrotactile stimulation (i.e., stimulation of tactile receptors with electric current), kinesthetic feedback, etc. Yet another alternative or additional embodiment may implement electrical muscle stimulations such as a task that requires a user to determine what movement or movements the system is making them do and/or making them feel like doing.

Haptic output device 26 is a device configured to output any form of haptic effects, such as vibrotactile haptic effects, electrostatic friction haptic effects, deformation haptic effects, etc., in response to a drive signal. Accordingly, haptic output device 26 may be an actuator, or in alternate embodiments, a non-mechanical or a non-vibratory device such as a device that uses electrostatic friction ("ESF") or ultrasonic surface friction ("USF"), a device that induces acoustic radiation pressure with an ultrasonic haptic transducer, a device that uses a haptic substrate and a flexible or deformable surface or shape changing device and that may be attached to a user's body, a device that provides projected haptic output such as a puff of air using an air jet, a laser-based projectile, a sound-based projectile, etc.

For example, one embodiment provides a laser-based projectile where laser energy ionizes air molecules in a concentrated region mid-air to provide plasma (a concentrated mixture of positive and negative particles). In one embodiment, the laser may be a femtosecond laser that emits pulses at very fast and very intense paces, and the faster the laser, the safer for humans to touch. The projectile may appear as a hologram that is haptic and interactive. When the plasma comes in contact with user skin, the user may sense the vibrations of energized air molecules in the concentrated region. Sensations on the user skin are caused by the waves that are generated when the user interacts with plasma in mid-air. Accordingly, haptic effects may be provided to the user by subjecting the user to such concentrated region. Alternatively or additionally, haptic effects may be provided to the user by subjecting the user to the vibrations generated by directed sound energy.

Further, in other alternate embodiments, system 10 may not include haptic output device 26, and a separate device from system 10 includes a haptic output device that generates the haptic effects, and system 10 sends generated haptic signals to that device through communication device 20.

In one embodiment, haptic output device 26 may be a "standard definition" ("SD") actuator that generates vibratory haptic effects at a single frequency. Examples of an SD actuator include an ERM and an LRA. In contrast to an SD actuator, a high definition ("HD") actuator or high fidelity actuator such as a piezoelectric actuator or an EAP actuator is capable of generating high bandwidth/definition haptic effects at multiple frequencies. HD actuators are characterized by their ability to produce wide bandwidth tactile effects with variable amplitude and with a fast response to transient drive signals. However, HD actuators are generally more expensive than SD actuators. Some devices consequently include only one or more SD actuators, instead of any HD actuators. Therefore, some embodiments may leverage one or more speakers 28 in a device in combination with the SD actuators to simulate HD haptic effects and provide an HD-like haptic experience without the need for HD actuators.

System 10, in one embodiment, further includes a speaker 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, a digital loudspeaker, etc. In alternate embodiments, system 10 may include one or more additional speakers, in addition to speaker 28 (not illustrated in FIG. 1). Further, in other alternate embodiments, system 10 may not include speaker 28, and a separate device from system 10 includes a speaker that outputs the audio effects, and system 10 sends audio signals to that device through communication device 20.

System 10, in one embodiment, further includes a sensor 30. Sensor 30 may be configured to detect a form of energy, or other physical property, such as, but not limited to, sound, movement, acceleration, biological signals, distance, flow, force/pressure/strain/bend, humidity, linear position, orientation/inclination, radio frequency, rotary position, rotary velocity, manipulation of a switch, temperature, vibration, visible light intensity, etc. Sensor 30 may further be configured to convert the detected energy, or other physical property, into an electrical signal, or any signal that represents virtual sensor information. Sensor 30 may be any device, such as, but not limited to, an accelerometer, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gauge, a hygrometer, a linear position touch sensor, a linear potentiometer (or slider), a linear variable differential transformer, a compass, an inclinometer, a magnetic tag (or a radio frequency identification ("RFID") tag), a rotary encoder, a rotary potentiometer, a gyroscope, an on-off switch, a temperature sensor (such as a thermometer, thermocouple, resistance temperature detector, thermistor, temperature-transducing integrated circuit, etc.), a microphone, a photometer, an altimeter, a biological monitor, a camera, a light-dependent resistor, etc., or any device that outputs an electrocardiogram, an electroencephalogram, an electromyograph, an electrooculogram, an electropalatograph, or any other electrophysiological output.

In alternate embodiments, system 10 may include one or more additional sensors, in addition to sensor 30 (not illustrated in FIG. 1). In some of these embodiments, sensor 30 and the one or more additional sensors may be part of a sensor array, or some other type of collection/arrangement of sensors. Further, in other alternate embodiments, system 10 may not include sensor 30, and a separate device from system 10 includes a sensor that detects a form of energy, or other physical property, and converts the detected energy, or other physical property, into an electrical signal, or other type of signal that represents virtual sensor information. The device may then send the converted signal to system 10 through communication device 20.

Generally, some known systems may provide haptic effects in a VR, AR, or MR environment. VR refers to using software to generate realistic images, sounds, and other sensations that replicate a real environment (or create an imaginary setting) and simulate a user's physical "presence" in this environment by enabling the user to interact with this space and any objects depicted therein using specialized display screens, projectors, or other devices. VR may be provided by systems such as Oculus Rift from Facebook, PlayStation VR from Sony, and Gear VR from Samsung. AR refers to a live direct or indirect view of a physical real world environment whose elements are augmented (or supplemented) by computer-generated sensory input such as sound, video, graphics, GPS data, etc. AR may be provided by smart glasses such as Google Glass from Google, Daqri Smart Helmet from Daqri, or Moverio from Epson. MR (also referred to as hybrid reality) refers to the merging of real and virtual worlds to produce new environments and visualizations where physical and digital virtual objects co-exist and interact in real time. Unlike AR, the virtual objects in MR interact with real objects and are not merely added as a virtual overlay on top of the real objects. MR may be provided by systems such as HoloLens from Microsoft.

Some known systems provide haptic feedback to a user of a VR/AR/MR system via pre-configured controllers of the VR/AR/MR system. For example, Valve provides an LRA-based "Rumblepad," Oculus provides a "Touch" controller, HTC provides a "Vive" controller, NeuroDigital provides "GloveOne" LRA-based haptic gloves, Nod provides a ring-based controller, Virtuix provides an "Omni" platform walker, and Striker VR provides an "Infinity" rifle controller. However, the haptic feedback provided by each of these known systems is limited to and constrained by the pre-configured controllers that come with each system. Further, although some of these controllers such as "Vive" and "Touch" use the same type of actuator, they each implement different proprietary application programming interface ("API") methods for calling an actuator to output a haptic feedback effect (e.g., calling a motor and sending voltages to the motor). As a result, the feeling provided by haptic feedback on one device may be different than the feeling provided by haptic feedback on the other device.

In contrast to the known systems, embodiments allow for VR/AR/MR users to add haptic feedback to their user experience when and where they wish, while still accounting for and accommodating such pre-configured controllers. Embodiments expand the "feel point" possibilities for the users so that the users can experience a more surrounded and positionally-based tactile VR/AR/MR environment. Embodiments allow a user to configure multiple haptic output devices to feel physically present through feedback received via multiple haptic channels based on body location and virtual physical elements in the three dimensional ("3D") VR/AR/MR space. Further, embodiments provide a haptic surround API that can control different haptic devices on different platforms, and can trigger the actuators of different haptic devices based on the virtual location of events in a virtual 3D space.

One embodiment implements multiple haptic actuation points on the body to augment or replace the existing haptic systems that are typically shipped with VR/AR/MR systems. The embodiment assigns haptic events to various body locations and varies the parameters of those haptic events through a haptic surround API.

One embodiment allows users to configure haptic actuation on desired locations on their body so that they can receive haptic feedback at those locations for specific VR/AR/MR situations/events. One embodiment allows haptic designers to provide haptic "surround" playback control in the 3D space (e.g., front, back, left, right, top, and bottom) similar to the functionality provided by surround sound in the two dimensional ("2D") space. Surround sound is a technique for enriching the sound reproduction quality of an audio source with additional audio channels from speakers that surround the listener (surround channels), providing sound from a 360° radius in the horizontal plane (2D), as opposed to "screen channels" (centre, [front] left, and [front] right) originating only from the listener's forward arc. Similarly, one embodiment provides surround haptic feedback in the 3D space by implementing multiple haptic channels that provide haptic feedback through haptic devices that surround the user.

In one embodiment, for example, a user in a VR/AR/MR environment may use a multi-actuator playback system that allows the user to place modular haptic elements such as wearable actuators on various body parts/areas such as chest, back, right hand, left hand, right foot, left foot, forehead, etc. In one embodiment, the locations of the actuators are determined/tracked in relation to each other as well as within the VR/AR/MR environment. Accordingly, the embodiment can trigger haptic effects based on where a virtual body part (e.g., virtual hands/feet/head) is located in the VR/AR/MR environment. The embodiment controls how these modular haptic elements provide haptic feedback in response to a situation/event in the VR/AR/MR environment. In one embodiment, when a haptic track is provided by a haptic designer, the original intent of the haptic designer is determined (whether they were designing for kinesthetic or full force feedback ("FFB"), rumble, thermal haptic feedback, flexing, etc., and whether the haptic effect was intended for a specific body location or not), and based on the original intent, corresponding haptic feedback is determined for each actuator. In one embodiment, the original intent of the haptic designer may be determined by reverse mapping the haptic effect to a corresponding haptic effect context in a look up table and determining the event for which the haptic effect had been designed.

In one embodiment, for example, in a gaming VR environment, a player may be in an exploration game using an Oculus Rift headset and standard "Touch" controllers that provide rumble feedback based on a position/motion sensing system. However, in addition to the two handheld input and feedback controllers, the player may also have wearable actuators placed on their chest, back, head, feet, etc. The actuators may be networked to the VR system such that they are also positionally sensed and motion tracked in the VR game space. When these body parts interact with the game play, the actuators may be triggered to allow the user to feel in-game events based on actuation body locations. For example, during a battle, the user may feel they have taken an impact to their head, chest, back, or legs, instead of just feeling their handheld game controllers rumble. As another example, when exploring a cave, the user may sense how cramped the space is by actuators triggering every time their head bumps the virtual ceiling or their elbows bump the virtual walls. In both situations, the user receives valuable body part specific tactile information that lets them better navigate the environment they are in and react to game situations, while becoming more immersed through the tactile surround experience.

In one embodiment, for example, in a gaming VR environment, a player may be using a mobile VR headset such as Samsung Gear VR, together with a non-haptic gamepad. If the player desires to add haptic feedback to their VR experience and receive haptic feedback on their hands and head, they can attach one haptic surround system actuator to each hand and to their head. The game they are playing may be designed and configured to provide a haptic surround experience which can identify that the player has left hand and right hand haptic actuation systems in place as well as an actuator on their head. When the game is played, the user may distinguish left versus right interactions in their game action through haptic feedback applied to their hands. The user may also feel environmental ambient effects via the head-based actuator. For example, a game designer may design haptic effects to provide haptic feedback related to the environmental/ambient via the head-based actuator. For example, the head-based actuator may provide screen shakes to simulate earthquakes, simulated wind, rain, or thunder effects, heartbeats to simulate low health or increasing feelings of anxiety/fear, etc., while the left and right hand actuators provide non-ambient haptic output corresponding to hand interactions such as pressing a button, pulling a trigger, throwing an object, etc.

In one embodiment, for example, a VR/AR/MR game developer may use a haptic surround API to assign a "player taking damage" haptic effect to specific elements of the game that affect a player's health such as being shot by a weapon. The haptic surround API functions together with the game's positional and relational object logic to identify where the player's position is in relation to a game play action in the VR/AR/MR space. For example, knowing a player's avatar body position in the virtual space, the embodiment may determine that the player is shot. The embodiment may further determine the location on the player's body where the shot impacts. The embodiment may then trigger a haptic actuator that is nearest to the impact location to play back the "player taking damage" haptic effect on the corresponding body part such as chest, back, head, right leg, left arm, etc.

One embodiment allows a user of a VR/AR/MR system to customize their haptic experience beyond a single haptic game input device by implementing one or more HAMs or actuation points (e.g., actuators in a wearable haptic suit) and a corresponding haptic surround API system. In one embodiment, a HAM may be an additional haptic output device beyond any existing haptic output device provided as part of the VR/AR/MR system. In one embodiment, an actuation point may be a HAM or any haptic output device that is provided as part of the VR/AR/MR system. Each HAM or actuation point is capable of providing a haptic response, implementing network communication with the VR/AR/MR system, and working with a position sensing API of the VR/AR/MR system. Each HAM or actuation point may also have further capabilities such as being wearable, being used for controller input, being wireless, having a rechargeable power source, including an onboard processor, and being user configurable.

In one embodiment, for example, each HAM or actuation point may provide controller input. Generally, a VR/AR/MR system such as a game may allow users to configure their input devices. For example, a user may assign a specific weapon or in-game action to a specific button on an input device (e.g., assign "pressing button A" to respond with a user character "jumping," assign "pressing button B" to respond with the user character "crouching," etc.). Similarly, in one embodiment, a HAM or an actuation point may be configured as an input device in the VR/AR/MR environment. For example, tapping a HAM that is placed on a left arm may respond with reloading a virtual weapon. In one embodiment, the input provided by a HAM or an actuation point may or may not result in a haptic output. In one embodiment, the input provided by a HAM or an actuation point may result in a haptic output that may or may not be output by the same HAM or actuation point that provided the input. For example, the user may be simulated as a robot in the VR/AR/MR environment, and tapping a HAM placed on their chest may be associated with a "self-destruct" command that causes haptic output from several HAMs placed on various body areas of the user in the haptic surround system.

In one embodiment, for example, each HAM or actuation point may be user configurable via switches to assign the HAM or actuation point to a body location. In one embodiment, for example, each HAM or actuation point may be configurable to vary haptic playback parameters of the HAM or actuation point such as magnitude, duration, frequency, pulse shape, etc.

In one embodiment, for example, a wearable may be placed/worn on any body location where the user desires to receive a haptic response based on VR/AR/MR interactions. In an alternative or additional embodiment, for example, haptic effects may be projected on any body location where the user desires to receive a haptic response based on VR/AR/MR interactions.

One embodiment implements a haptic surround API that allows for sensing the location of the HAMs/actuation points and associating the HAMs/actuation points with body locations such as chest/back, right/left arm, right/left hands, right/left feet, front/back/side of head, etc. The haptic surround API may further allow for assigning haptic effects to specific in-app/game events such as firing a weapon, taking damage from a weapon, etc. The haptic surround API may further allow for assigning haptic effects to one or more specific body locations. For example, for simulating an earthquake, a haptic feedback may be assigned to all body locations, but for simulating taking damage, a haptic feedback may be assigned only to the player's specifically affected body locations defined by the damage type.

The haptic surround API may further allow for the parameters of the triggered haptic effect to vary across multiple HAMs/actuation points based on each HAM's/actuation point's respective position in the 3D space where the haptic effect is triggered. For example, when a grenade explodes behind a player, the explosion may be felt on each of the player's HAMs/actuation points, but may be felt strongest on the HAMs/actuation points located nearest the location of the explosion in the 3D space.

The haptic surround API may further allow for user configuration overrides in case a user desires to assign a haptic response to other body locations. For example, a user may desire to remove the HAMs/actuation points that are physically located on their feet and place them on their knees, but may not wish a Leap Motion (or other motion/position sensing equipment) to associate the virtual location of the HAMs/actuation points that were previously placed on the feet with the new physical location on the user's knees. In one embodiment, this may be due to a user preference to feel on the knees the haptic output originally defined/configured for the feet. In an alternative or additional embodiment, this may be due to the haptic output device capabilities of a HAM/actuation point on the feet being the best actuator capabilities available to the user in their haptic surround system, and they may prefer to use those actuators to augment the haptic effects they feel on their knees.

In one embodiment, a haptic surround API may call API methods of standard controllers that are provided by a platform of a VR/MR/AR system when the VR/MR/AR system provides third party access to its platform and its APIs. Accordingly, the haptic surround API may control the haptic feedback provided by controllers of a VR/MR/AR system, while also controlling the haptic feedback provided by any haptic devices added by a user to the VR/MR/AR system.

In one embodiment, the haptic surround system implements a haptic API control layer that includes several API layers. A first API layer allows for additional haptic devices to be assigned/added to the VR/AR/MR system. A second API layer allows for conversion of original haptic effects in a game/app so that they can be ported to, and played on, new or different devices with different haptic playback capabilities. A third API layer allows for haptic effects to be assigned to specific body locations or haptic output devices. A fourth API layer allows for users to assign haptic playback preferences based on, for example, haptic device capability, physical location, content type or ratings such as Entertainment Software Rating Board ("ESRB") ratings, etc. In various embodiments, one or more of these layers may be implemented by a central module in the VR/AR/MR system (host control), or may be implemented locally at a respective haptic device (local control).

In one embodiment, the haptic API control layer may change/adjust haptic effects based on the capabilities of each haptic output device so that the haptic effect feels "consistent" when output by different types of actuators. For example, in one embodiment, a HAM may implement an ERM rumble motor and another HAM from a different manufacturer may implement an LRA actuator. When an explosion haptic effect is played back on both HAMs, if the same voltage is applied to the ERM-based HAM and the LRA-based HAM, the HAMs may cause a very inconsistent/different feeling to the user. However, in one embodiment, the haptic API control layer adjusts the voltage parameters for the playback based on the voltage requirements of each specific actuator so that a consistent feeling of the explosion is provided to the user by both HAMs.

In one embodiment, the haptic API control layer is platform agnostic, meaning it can interface controllers/devices on different platforms. As such, the haptic API control layer allows a designer to design haptic effects that can be output by platform-specific controllers/devices as well as third party haptic output devices with different capabilities. In order to be platform agnostic, the haptic API control layer implements "abstraction" functionality over platform-specific API calls. For example, an API call for outputting a specific haptic functionality by Oculus "Touch" may be "Vibrate On" with "Magnitude 100", while an API call for outputting the same haptic functionality by HTC "Vive" may be "haptic interface+". However, a designer may design an abstracted call for the haptic API control layer for outputting that haptic functionality. Then, depending on the haptic output device to be used (e.g., a platform-specific output device such as the Oculus "Touch" or the HTC "Vive," or a third party output device), the haptic API control layer converts the abstracted API call to the appropriate API call that can be understood by the haptic output device.

In one embodiment, for example, an Oculus "Touch" VR controller may use an "OVRHaptics" call to programmatically control haptic feedback, while a Steam VR controller may use a "StartHapticVibration" call for the same programmatic control. In this case, the haptic API control layer converts an abstracted API haptic effect playback call into the appropriate API call that a target haptic output device expects/understands.

Figure 2:
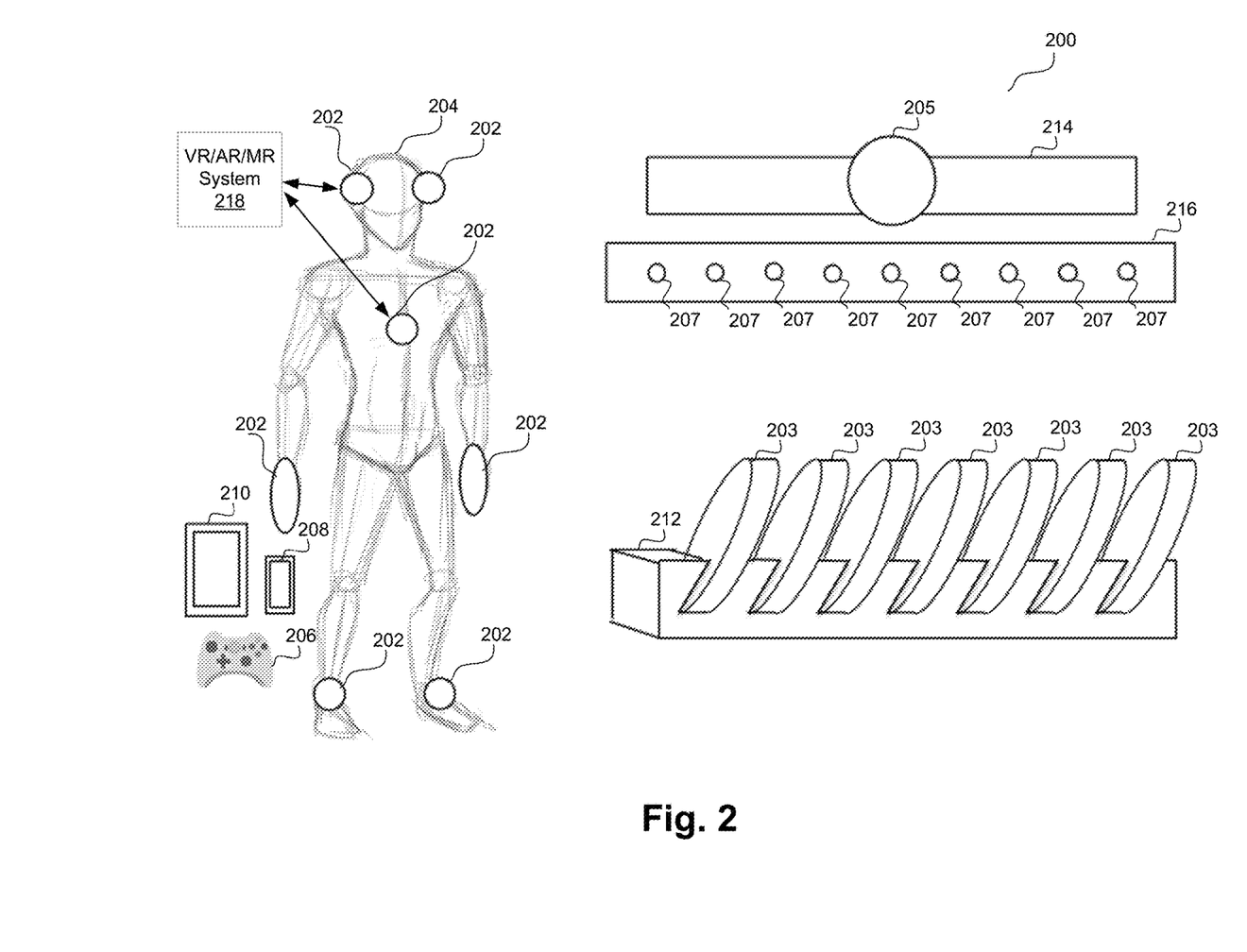
FIGS. 2-4 illustrate example systems for providing haptic functionality according to an embodiment of the present invention.

FIG. 2 illustrates an example of a system 200 for providing haptic surround functionality. In system 200, a number of HAMs/actuation points 202 are placed at various body locations of a user 204. Each HAM/actuation point 202 includes a haptic output device such as an actuator, as well as functionality to communicate (e.g., wirelessly or through a wire) with a VR/AR/MR system 218. Each HAM/actuation point 202 also includes electronics and software in order to drive its haptic output device. The haptic output device may provide haptic functionality according to any embodiments described herein. For example, the haptic output device may provide haptic feedback including vibration, deformation, heat, ESF, or any other type of haptic actuation known in the art. Further, one or more other haptic output devices may be implemented within system 200 to provide additional haptic feedback to user 204. For example, a vibration actuator may be embedded into floor tiles so that it can transmit vibrations to the feet of user 204. As another example, an ultrasound emitter can be embedded in a wall so that it can project haptic effects to user 204. As another example, a peltier cell can be embedded in a physical object (e.g., a door handle) in an AR/MR environment so that it can change its temperature when touched by user 204. Alternatively or additionally, a gamepad controller 206, a smartphone 208, a wearable device 214, 216, a touchpad device 210, or any other device that includes haptic actuators can be used to provide additional haptic effects to user 204.

Each HAM/actuation point 202 may connect to VR/AR/MR system 218 directly through a WiFi or other wireless network or indirectly through a gateway using Bluetooth or other networking technologies. Each HAM/actuation point 202 may also connect directly to VR/AR/MR system 218 using Bluetooth or other short range wireless technologies. In some embodiments, the communication may first be established through near field communication ("NFC"), WiFi, or other wireless technologies, and then switched to a more efficient short-range technology such as Bluetooth.

In one embodiment, once a HAM/actuation point 202 is connected to VR/AR/MR system 218 through wired or wireless communication, it can receive commands for providing haptic effects. It may also communicate with VR/AR/MR system 218 to provide various information, for example, information about its capabilities, its sensor readings, etc.

In one embodiment, different HAMs/actuation points 202 may include different haptic actuator types such as vibration actuators, kinesthetic actuators, combination actuators (one device including more than one actuator type), wearables, projected haptics, etc.

In one embodiment, VR/AR/MR system 218 implements position sensing functionality and tracks the location of HAMs/actuation points 202 relative to each other as well as in the 3D virtual space and on user 204. Any known position sensing functionality may be implemented in VR/AR/MR system 218 to track HAMs/actuation points 202, such as magnetic tracking (measuring the intensity of the magnetic field in various directions), acoustic tracking (measuring the time it takes a known acoustic signal to reach known receivers), inertial tracking (using an accelerometers and gyroscopes), optical tracking (using various cameras to obtain positional information), etc., or any other proximity sensing functionality (detecting the presence of nearby objects without any physical contact). In one embodiment, for example, VR/AR/MR system 218 includes one or more remote sensors such as cameras or depth sensors that implement position and motion tracking functionality and detect the presence of user 204 and or detect various body parts of user 204.

In one embodiment, HAMs/actuation points 202 may include "self-aware" location determination functionality to determine their own location within the VR/AR/MR environment and their location relative to each other and on user 204. The self-aware location determination functionality may be implemented by any known positioning system such as Wi-Fi location determination (triangulating the position of a device based on the signals received from other Access Points ("AP")), In these embodiments, HAMs/actuation points 202 may periodically determine their location and communicate their determined location with VR/AR/MR system 218. In one embodiment, such location information may be used in the VR/AR/MR environment to provide "body mapping" functionality to augment or replace the position and motion sensing/tracking functionality within the VR/AR/MR environment.

In one embodiment, input to a HAM/actuation point 202 may be provided via an accessory controller or via a controller input of a HAM/actuation point 202 itself.

In one embodiment, HAMs/actuation points 202 are configured to work with a haptic surround API of VR/AR/MR system 218, as well as with any existing controller API methods in the VR/AR/MR environment. In one embodiment, for example, HAMs/actuation points 202 may be configured to work with mobile input from smartphone 208 or touchpad device 210.

In one embodiment, for example, a HAM/actuation point 202 may be any input device that can be triggered to provide haptic effects (e.g., an ERM, an FFB actuator, etc.). In one embodiment, for example, a HAM/actuation point 202 may be implemented via a controller such as a "Rumblepad" from Logitech, a "GloveOne" LRA-based haptic glove from NeuroDigital, a "Touch" controller from Oculus, etc.

In one embodiment, each HAM/actuation point 202 is user configurable within system 200 (e.g., via switches). For example, for each HAM/actuation point 202, a user may select appropriate switches to configure the assigned location of HAM/actuation point 202 as left/right, hand/foot, head, body, etc. In various embodiments, the switches may be located on each HAM/actuation point 202 or on a device separate from HAM/actuation points 202. Further, for each HAM/actuation point 202, a user may configure haptic parameters of each HAM/actuation point 202 such as magnitude, duration, frequency, pulse shape, etc.

In one embodiment, HAMs/actuation points 202 may be wireless and may be rechargeable via a charging station 212. Charging station 212 may include multiple slots, and one or more HAMs/actuation points 203 that are not in use may be placed in the slots to be charged. In one embodiment, charging station 212 may also provide networking and position sensing functionality in VR/AR/MR system 218.

In one embodiment, a HAM/actuation point 205 may be attached to a strap 214 (e.g., Velcro) so that it can be secured to a body part of user 204. In one embodiment, multiple HAMs/actuation points 207 may be embedded within pockets in a fabric 216 so that they can be worn on the body of user 204.

Each HAM/actuation point (e.g., HAM/actuation point 202) shown in FIG. 2, and in any of the following figures, may be implemented by system 10 of FIG. 1 in one embodiment, and may include all or a subset of the elements shown in FIG. 1. Further, VR/AR/MR system 218 shown in FIG. 2, and the VR/AR/MR systems shown in any of the following figures, may be implemented by system 10 of FIG. 1 in one embodiment, and may include all or a subset of the elements shown in FIG. 1.

Figure 3:
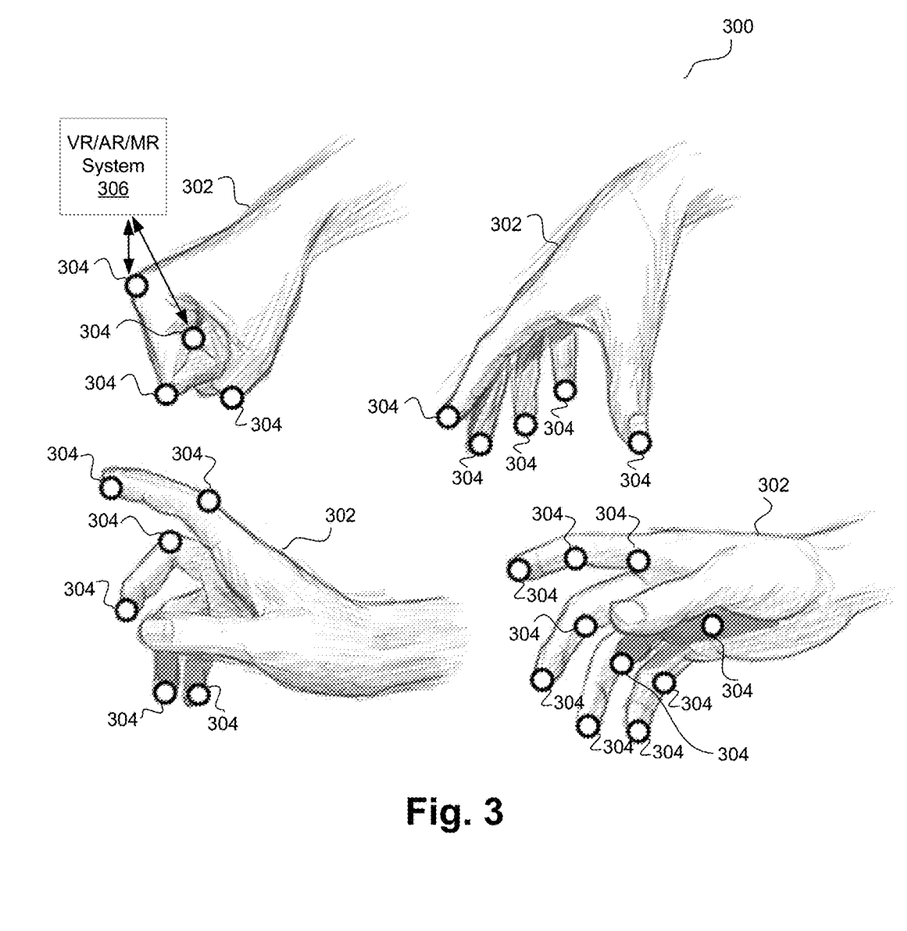

FIG. 3 is another example of a system 300 in which multiple HAMs/actuation points 304 are implemented at various locations on a glove 302 and communicate with a VR/AR/MR system 306. Accordingly, a user wearing glove 302 may configure HAMs/actuation points 304 to receive haptic feedback at various locations on their hands/fingers. HAMs/actuation points 304 may be attached to glove 302 by, for example, Velcro or small straps, or may be placed within pockets on glove 302. In one embodiment, glove 302 may be implemented as disjoint finger cots. In one embodiment, HAMs/actuation points 304 in system 300 may be user configurable and may provide any other functionality described herein with reference to HAMs/actuation points 202 in system 200 of FIG. 2. System 300 may further include a charging station similar to charging station 212 in system 200 of FIG. 2. In one embodiment, a user may purchase and implement as many HAMs/actuation points 304 as the API of VR/AR/MR system 306 can support.

Figure 4:
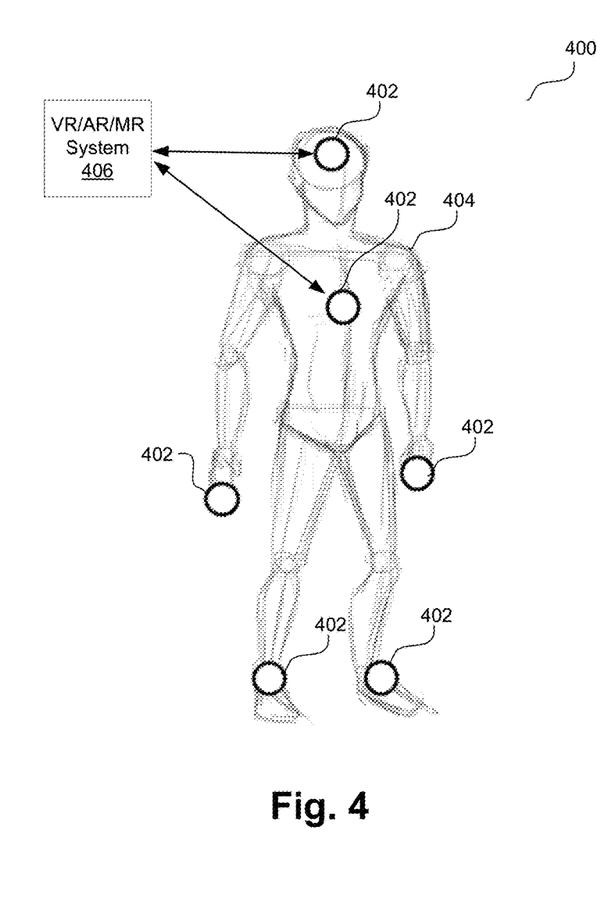

FIG. 4 is an example system 400 that is implemented based on one or more network connected devices 402 of a user 404. Each network connected device 402 may communicate with a VR/AR/MR system 406 and may be used as a separate input device in a VR/AR/MR environment such as a VR game, thereby providing multimodal interaction. Examples of such network connected devices 402 are smartphones, network connected wearables (e.g., a smartwatch, a helmet, cloths, or shoes), etc. Each network connected device 402 may further include an actuator and may therefore be capable of providing haptic functionality. Accordingly, each network connected device 402 may also be used as a HAM/actuation point in system 400. In one embodiment, HAMs/actuation points in network connected devices 402 in system 400 may be user configurable and may provide any other functionality described herein with reference to HAMs/actuation points 202 in system 200 of FIG. 2.

In one embodiment, an existing system that does not provide haptic surround functionality (e.g., an existing VR/AR/MR system with position and motion sensing functionality and with original input devices) may be augmented with haptic surround system elements by implementing a haptic surround API. The haptic surround API may include an API layer for controlling additional devices (e.g., additional input devices, additional HAMs/actuation points, etc.), an API layer for haptic effect assignment to each HAM/actuation point, an API layer for body location configuration for each HAM/actuation point, and an API layer for setting haptic preferences for each HAM/actuation point.

Figure 5:
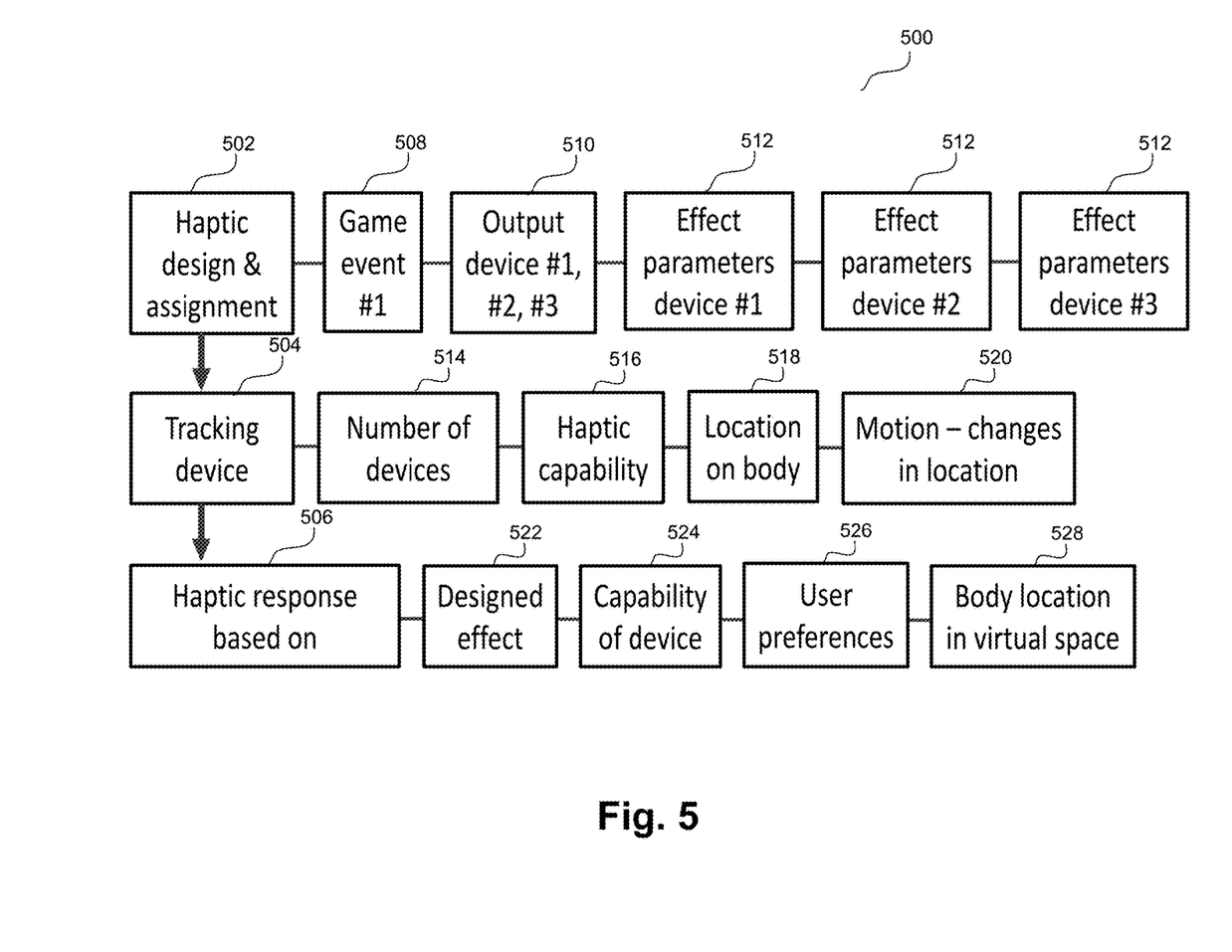
FIG. 5 is a block diagram of haptic functionality in accordance with embodiments of the present invention.

FIG. 5 is an example block diagram 500 illustrating haptic surround system process and response functionality in one embodiment. In block diagram 500, haptic surround functionality is implemented by haptic effect design and assignment 502 over a number of haptic output devices, tracking 504 of the haptic output devices, and outputting haptic responses 506 via the haptic output devices.

In one embodiment, haptic effect design and assignment 502 is performed for each VR/AR/MR event 508 and over each haptic output device 510 by setting corresponding haptic effect parameters 512 for each haptic output device. Examples of VR/AR/MR events 508 are a game event such as taking damage, an ambient event such as an earthquake, etc. For example, for a specific event such as a player taking damage, appropriate haptic output devices are determined and respective haptic effect parameters are assigned to each haptic output device.

In one embodiment, haptic output device tracking 504 is performed by determining the number of haptic output devices 514 (e.g., how many haptic output devices are currently being used as haptic output devices in a VR/AR/MR environment), determining the haptic capabilities of each device 516 (e.g., the types and the quality of haptic effects that the device can output), determining the location of each device on the user body 518 (e.g., right/left, hand/feet, chest, head, etc.), and determining any device motion or location change 520. In one embodiment, the motion or location change may correspond to a motion or location change of the user in a virtual environment. In one embodiment, the motion or location change may correspond to moving a haptic output device from one body location of the user to another body location of the user. In one embodiment, haptic device tracking 504 identifies whether each haptic output device is where it is configured to be (e.g., whether a device assigned to a left hand is on the left hand).

In one embodiment, outputting a haptic response 506 via a haptic output device is performed by determining a designed haptic effect 522 for the device (e.g., by looking up in a database/memory or by synthesizing based on an event occurring in the virtual space), determining haptic capabilities of the device 524 (e.g., what haptic effects the device can produce), user preferences 526 (e.g., whether the user has indicated a desire for a certain magnitude/frequency/duration of haptic effects), and the location of the user's body in the virtual environment 528 (e.g., what events in the virtual space will affect the user at its location in the virtual space).

Figure 6:
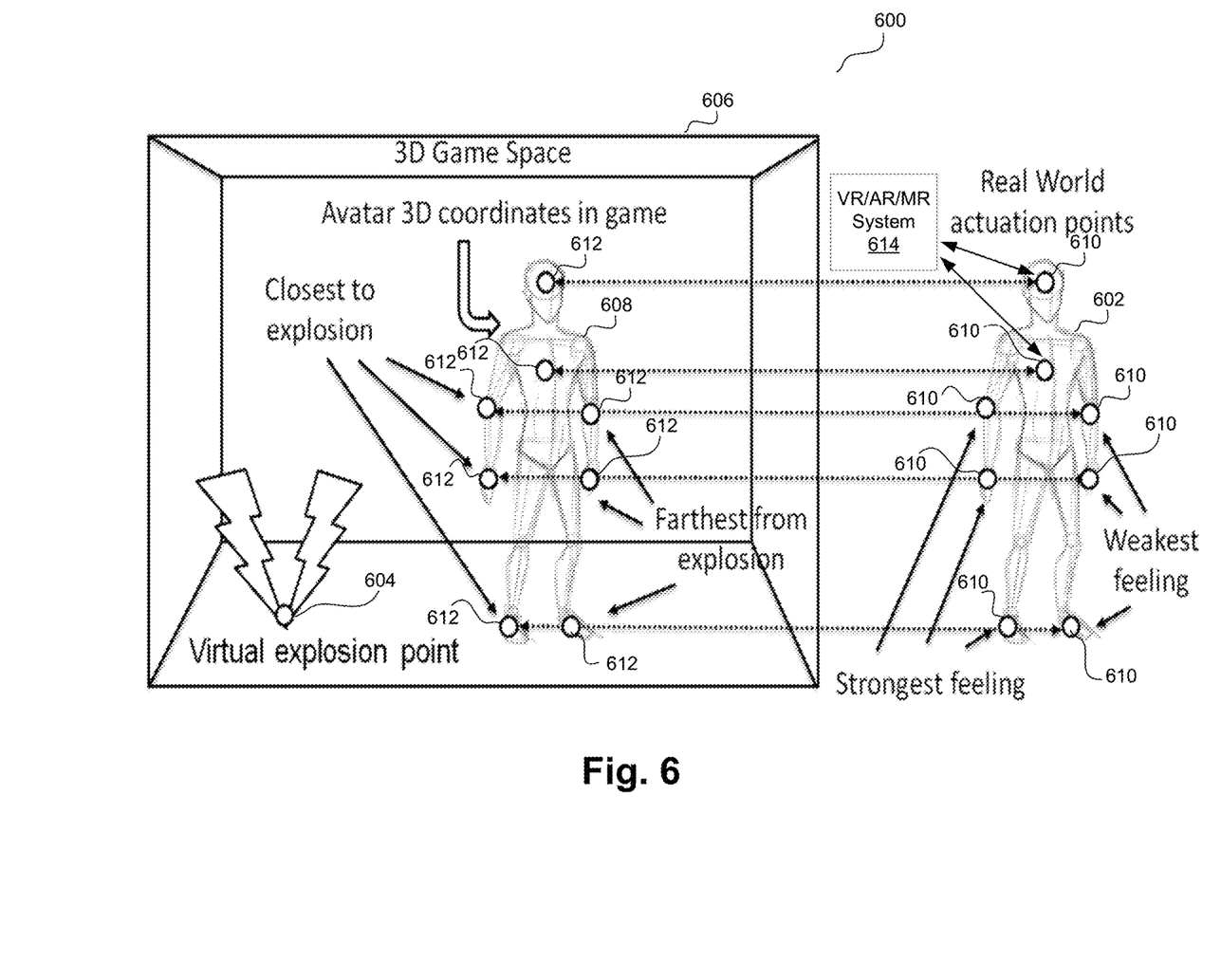
FIG. 6 illustrates another example system for providing haptic functionality according to an embodiment of the present invention.

FIG. 6 is an example system 600 that provides haptic feedback to a user 602 when a virtual explosion 604 happens in a virtual space 606 (e.g., a 3D game space) near an avatar 608 of user 602. System 600 includes a VR/AR/MR system 614 that provides a mapping between real actuation points 610 on the body of user 602 and corresponding virtual actuation points 612 on avatar 608, and performs haptic parameter control based on the relative locations of virtual actuation points 612 with respect to virtual explosion 604. For example, in one embodiment, VR/AR/MR system 614 may identify virtual actuation points 612 that are closest to explosion point 604 in virtual space 606, and assign haptic effects to the corresponding real actuation points 610 so that they cause the strongest haptic feedback (e.g., highest magnitude, frequency, and/or duration) to user 602. Similarly, VR/AR/MR system 614 may identify virtual actuation points 612 that are farthest from explosion point 604 in virtual space 606, and assign haptic effects to the corresponding real actuation points 610 so that they cause the weakest haptic feedback (e.g., lowest magnitude, frequency, and/or duration) to user 602.

Embodiments are also applicable for communicating physical presence as provided, for example, by the "Tactile Presence" solution from Immersion. Tactile Presence provides an API for mobile communication applications to call low-power haptics, also known as tactile effects. By creating and transmitting tactile information between two mobile devices, Tactile Presence adds a sense of physical presence to interactive mobile experiences, and a user can feel the remote actions of another user through the application of dynamic tactile effects that capture and communicate emotive information, creating meaningful telepresence.

Figure 7:
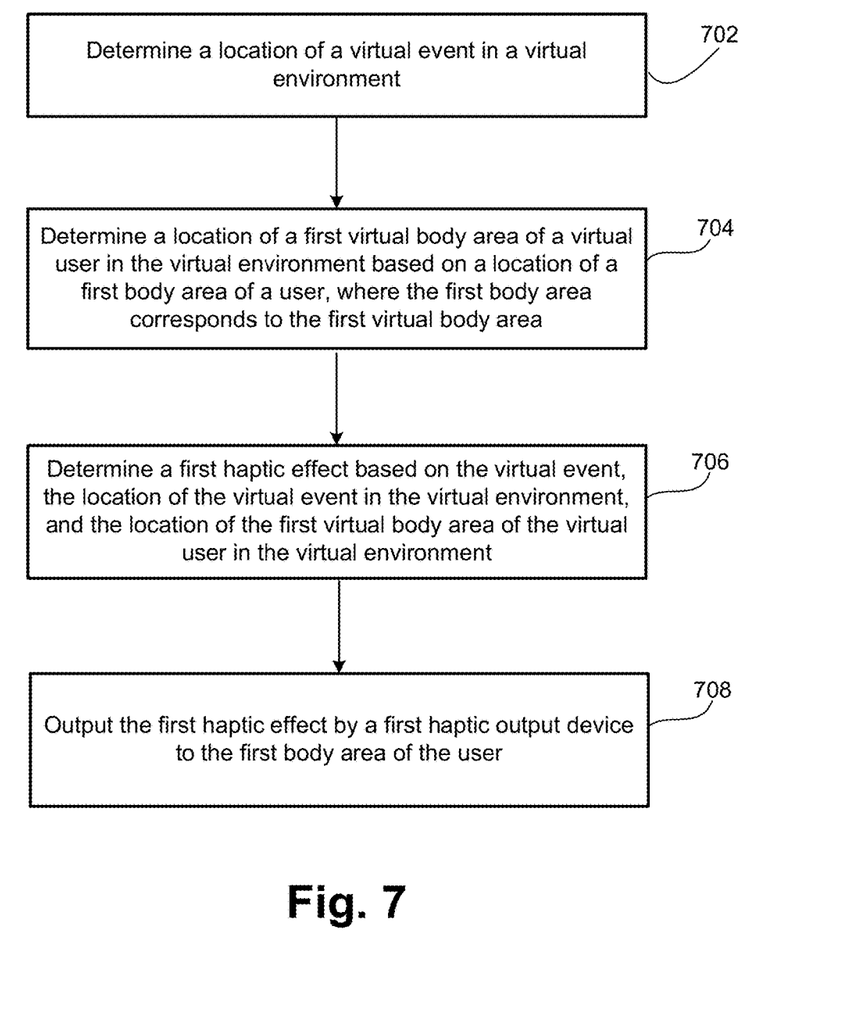
FIG. 7 is a flow diagram of the operation of the haptics module of FIG. 1 when performing haptic functionality in accordance with embodiments of the present invention.

FIG. 7 is a flow diagram of haptics module 16 of FIG. 1 when producing haptic surround functionality in accordance with embodiments of the present invention. In one embodiment, the functionality of the flow diagram of FIG. 7 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 702 a location of a virtual event in a virtual environment is determined.

At 704 a location of a first virtual body area of a virtual user in the virtual environment is determined based on a location of a first body area of a user, where the first body area corresponds to the first virtual body area.

At 706 a first haptic effect is determined based on the virtual event, the location of the virtual event in the virtual environment, and the location of the first virtual body area of the virtual user in the virtual environment.

At 708 the first haptic effect is output by a first haptic output device to the first body area of the user. In one embodiment, the first haptic output device is assigned to the first body area of the user by an API.

In one embodiment, a second haptic output device is assigned to a second body area of the user by the API. In one embodiment, a location of a second virtual body area of the virtual user in the virtual environment is determined, where the second virtual body area corresponds to the second body area of the user. In one embodiment, a second haptic effect is determined based on the virtual event, the location of the virtual event in the virtual environment, and the location of the second virtual body area of the virtual user in the virtual environment. In one embodiment, the second haptic effect is different than the first haptic effect. In one embodiment, the second haptic effect is output by the second haptic output device to the second body area of the user.

In one embodiment, the determining of the first haptic effect is further based on a capability of the first haptic output device, and the determining of the second haptic effect is further based on a capability of the second haptic output device.

In one embodiment, the determining of the first haptic effect is further based on a first user preference that corresponds to the first body area of the user, and the determining of the second haptic effect is further based on a second user preference that corresponds to the second body area of the user. In one embodiment, the first user preference and the second user preference are configured by the API.

In one embodiment, the first haptic output device is re-assigned to a third body area of the user by the API when the first haptic output device is moved from the first body area of the user to the third body area of the user.

As disclosed, embodiments allow for implementing and configuring multiple actuators in a VR/AR/MR environment and providing various haptic feedback by those haptic output devices to provide a haptic surround system. In one embodiment, a user may freely add/remove haptic output devices in the VR/AR/MR environment and configure them based on their location on the body and/or based on user preferences on haptic feedback at a specific body location. Accordingly, embodiments allow for a more surrounded and positionally-based haptic feedback in the VR/AR/MR environment.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to provide haptic surround functionality for implementation in a virtual environment, the providing comprising:
   tracking a first sensed location of a first haptic output device and a second sensed location of a second haptic output device according to a position sensing system including one or more remote sensors;
   assigning the first haptic output device to a first body area of a user according to the first sensed location of the first haptic output device;
   assigning the second haptic output device to a second body area of the user according to the second sensed location of the second haptic output device;
   determining a location of a virtual event in the virtual environment;
   determining a location of a first virtual body area of a virtual user in the virtual environment based on a location of the first body area of the user, wherein the first body area corresponds to the first virtual body area;
   determining a location of a second virtual body area of the virtual user in the virtual environment based on a location of the second body area of the user, wherein the second virtual body area corresponds to the second body area of the user;
   determining a first haptic effect based on the location of the virtual event in the virtual environment with respect to the location of the first virtual body area of the virtual user in the virtual environment;
   determining a second haptic effect based on the location of the virtual event in the virtual environment with respect to the location of the second virtual body area of the virtual user in the virtual environment, wherein the second haptic effect is different than the first haptic effect based on the relative locations of the first and second virtual body areas with respect to the location of the virtual event;
   outputting the first haptic effect by the first haptic output device to the first body area of the user; and
   outputting the second haptic effect by the second haptic output device to the second body area of the user.

2. The non-transitory computer readable medium of claim 1, wherein the determining of the first haptic effect is further based on a capability of the first haptic output device, wherein the determining of the second haptic effect is further based on a capability of the second haptic output device.

3. The non-transitory computer readable medium of claim 1, wherein the determining of the first haptic effect is further based on a first user preference that corresponds to the first body area of the user, wherein the determining of the second haptic effect is further based on a second user preference that corresponds to the second body area of the user.

4. The non-transitory computer readable medium of claim 3, wherein the first user preference and the second user preference are configured by an application programming interface.

5. The non-transitory computer readable medium of claim 1, wherein the first haptic output device is re-assigned to a third body area of the user by an application programming interface when the first haptic output device is moved from the first body area of the user to the third body area of the user.

6. A method of providing haptic surround functionality for implementation in a virtual environment, comprising:
   tracking a first sensed location of a first haptic output device and a second sensed location of a second haptic output device according to a position sensing system including one or more remote sensors;
   assigning the first haptic output device to a first body area of a user according to the first sensed location of the first haptic output device;
   assigning the second haptic output device to a second body area of the user according to the second sensed location of the second haptic output device;
   determining a location of a virtual event in the virtual environment;
   determining a location of a first virtual body area of a virtual user in the virtual environment based on a location of the first body area of the user, wherein the first body area corresponds to the first virtual body area;
   determining a location of a second virtual body area of the virtual user in the virtual environment based on a location of the second body area of the user, wherein the second virtual body area corresponds to the second body area of the user;
   determining a first haptic effect based on the location of the virtual event in the virtual environment with respect to the location of the first virtual body area of the virtual user in the virtual environment;
   determining a second haptic effect based on the location of the virtual event in the virtual environment with respect to the location of the second virtual body area of the virtual user in the virtual environment, wherein the second haptic effect is different than the first haptic effect based on the relative locations of the first and second virtual body areas with respect to the location of the virtual event;
   outputting the first haptic effect by the first haptic output device to the first body area of the user; and
   outputting the second haptic effect by the second haptic output device to the second body area of the user.

7. The method of claim 6, wherein the determining of the first haptic effect is further based on a capability of the first haptic output device, wherein the determining of the second haptic effect is further based on a capability of the second haptic output device.

8. The method of claim 6, wherein the determining of the first haptic effect is further based on a first user preference that corresponds to the first body area of the user, wherein the determining of the second haptic effect is further based on a second user preference that corresponds to the second body area of the user.

9. The method of claim 8, wherein the first user preference and the second user preference are configured by an application programming interface.

10. The method of claim 6, further comprising reassigning the first haptic output device to a third body area of the user by an application programming interface when the first haptic output device is moved from the first body area of the user to the third body area of the user.

11. A system for providing haptic surround functionality for implementation in a virtual environment, comprising:
a processor;
a memory unit storing instructions for execution by the processor;
a first haptic output device;
a second haptic output device; and
a position sensing system including one or more remote sensors, the position sensing system being configured to track the first and second haptic output devices, wherein the instructions are configured to cause the processor to
track a first sensed location of the first haptic output device and a second sensed location of the second haptic output device according to the position sensing system;
assign the first haptic output device to a first body area of a user according to the first sensed location of the first haptic output device,
assign the second haptic output device to a second body area of the user according to the second sensed location of the second haptic output device;
determine a location of a virtual event in the virtual environment,
determine a location of a first virtual body area of a virtual user in the virtual environment based on a location of the first body area of the user, wherein the first body area corresponds to the first virtual body area, and
determine a location of a second virtual body area of the virtual user in the virtual environment based on a location of the second body area of the user, wherein the second virtual body area corresponds to the second body area of the user;
determine a first haptic effect based on the location of the virtual event in the virtual environment with respect to the location of the first virtual body area of the virtual user in the virtual environment; and
determine a second haptic effect based on the location of the virtual event in the virtual environment with respect to the location of the second virtual body area of the virtual user in the virtual environment, wherein the second haptic effect is different than the first haptic effect based on the relative locations of the first and second virtual body areas with respect to the location of the virtual event,
wherein the first haptic output device is configured to output the first haptic effect to the first body area of the user and the second haptic output device is configured to output the second haptic effect to the second body area of the user.

12. The system of claim 11, wherein the instructions are further configured to cause the processor to determine the first haptic effect further based on a capability of the first haptic output device, and determine the second haptic effect further based on a capability of the second haptic output device.

13. The system of claim 11, wherein the instructions are further configured to cause the processor to determine the first haptic effect further based on a first user preference that corresponds to the first body area of the user, and determine the second haptic effect further based on a second user preference that corresponds to the second body area of the user.

14. The system of claim 13, wherein the first user preference and the second user preference are configured by an application programming interface.

15. The non-transitory computer readable medium of claim 1, wherein the first haptic device includes at least one of the one or more remote sensors and is configured to communicate its location to the processor.

16. The method of claim 6, wherein the first haptic device includes at least one of the one or more remote sensors and is configured to communicate its location to the processor.

17. The system of claim 11, wherein the first haptic device includes at least one of the one or more remote sensors and is configured to communicate its location to the processor.

18. The non-transitory computer readable medium of claim 1, wherein the first haptic effect is stronger than the second haptic effect when the location of the virtual event is closer to the location of the first virtual body area than to the location of the second virtual body area, and
wherein the second haptic effect is stronger than the first haptic effect when the location of the virtual event is closer to the location of the second virtual body area than to the location of the first virtual body area.

19. The method of claim 6, wherein the first haptic effect is stronger than the second haptic effect when the location of the virtual event is closer to the location of the first virtual body area than to the location of the second virtual body area, and
wherein the second haptic effect is stronger than the first haptic effect when the location of the virtual event is closer to the location of the second virtual body area than to the location of the first virtual body area.

20. The system of claim 11, wherein the first haptic effect is stronger than the second haptic effect when the location of the virtual event is closer to the location of the first virtual body area than to the location of the second virtual body area, and
wherein the second haptic effect is stronger than the first haptic effect when the location of the virtual event is closer to the location of the second virtual body area than to the location of the first virtual body area.

* * * * *